United States Patent [19]

Shale et al.

[11] 3,976,747

[45] Aug. 24, 1976

[54] MODIFIED DRY LIMESTONE PROCESS FOR CONTROL OF SULFUR DIOXIDE EMISSIONS

[75] Inventors: Correll C. Shale; William G. Cross, both of Morgantown, W. Va.

[73] Assignee: The United States of America as represented by the United States Energy Research and Development Administration, Washington, D.C.

[22] Filed: June 6, 1975

[21] Appl. No.: 584,424

[52] U.S. Cl. .............................. 423/244; 423/551; 423/555
[51] Int. Cl.² ...................... B01J 8/00; C01B 17/00
[58] Field of Search ...................... 423/242–244, 423/551, 555

[56] References Cited
UNITED STATES PATENTS

| 3,505,008 | 4/1970 | Frevel et al. | 423/244 |
| 3,851,042 | 11/1974 | Minnick | 423/244 |
| 3,862,295 | 1/1975 | Tolles | 423/244 |

FOREIGN PATENTS OR APPLICATIONS

| 435,560 | 9/1935 | United Kingdom | 423/244 |

*Primary Examiner*—Oscar R. Vertiz
*Assistant Examiner*—Gregory A. Heller
*Attorney, Agent, or Firm*—Dean E. Carlson; Davis S. Zachry; Allen H. Uzzell

[57] ABSTRACT

A method and apparatus for removing sulfur oxides from flue gas comprise cooling and conditioning the hot flue gas to increase the degree of water vapor saturation prior to passage through a bed of substantially dry carbonate chips or lumps, e.g., crushed limestone. The reaction products form as a thick layer of sulfites and sulfates on the surface of the chips which is easily removed by agitation to restore the reactive surface of the chips.

5 Claims, 3 Drawing Figures

MODIFIED DRY LIMESTONE PROCESS FOR CONTROL OF SULFUR DIOXIDE EMISSIONS

BACKGROUND OF THE INVENTION

The present invention relates to the art of stack gas scrubbing, and more particularly to the selective removal of acidic impurities from a stream of mixed gases, i.e., sulfur oxides from flue gases. The term "flue gas" or "stack gas" as used herein refers to the hot gaseous waste mixture resulting from various sulfur oxide producing processes, i.e., stack gas from smelters or coal-fired electric power plants.

With growing dependence on coal as an energy source for the generation of electric power, the removal of sulfur compounds from flue gases is becoming a significant problem. Electric utilities are currently meeting air quality standards by burning low sulfur western coal. The cost of shipping this coal is very high, forcing electrical utilities in the east to install flue gas desulfurization systems to enable the plants to burn eastern coal of higher sulfur content. The requirements of a flue gas desulfurization process are twofold; the technique of the process must be highly effective for the removal of $SO_2$ and $SO_3$ from flue gases, and the system must be highly reliable to enable it to remain on line almost continuously. In addition, it is desirable that a flue gas desulfurization process be economical with respect to the use of water and the disposal of waste scrubbing medium.

DESCRIPTION OF THE PRIOR ART

In a typical flue gas desulfurization process, flue gases are passed through a scrubbing medium which selectively removes a substantial amount of the sulfur oxides from the gas stream.

It has long been known that most of the sulfur oxide content of flue gases can be removed by passing the gases through an aqueous slurry of lime or limestone. The wet lime/limestone processes in wide use today have been plagued with problems of corrosion, erosion, silting, plugging, scaling, and mechanical failure associated with the use of a slurry. In addition, the processes are very wasteful with respect to water, requiring vast settling ponds for waste sludge and often involving extensive discharge of liquid wastes into local waterways. The wet limestone process is also wasteful with respect to the scrubbing medium, utilizing only about 65% of the available limestone in the scrubbing process.

In an effort to eliminate the problems of operating a slurry gas scrubbing system, various dry processes have been developed. One such process involves the injection of finely ground dry limestone directly into the boiler of a power plant. This process had many inherent difficulties associated with the handling of large quantities of finely divided powder, and was only 30% efficient for $SO_2$ removal. Other dry processes involve the physical adsorption of sulfur compounds on a dry bed of activated carbon. These processes involve the carbon catalyzed oxidation of $SO_2$ to $SO_3$ which is hydrolyzed by water vapor, forming $H_2SO_4$ which is readily adsorbed on activated carbon. Tolles, in U.S. Pat. No. 3,862,295, issued Jan. 21, 1975, disclosed that increasing the water vapor content of the flue gas enhances the rate of hydrolysis of $SO_3$, hence increasing the overall $SO_2$ removal rate. Tolles teaches that the overall $SO_2$ removal rate on activated carbon is directly dependent on the relative humidity of the flue gas, rather than upon the temperature. One inherent disadvantage of the Tolles process is that it produces sulfuric acid. While at present sulfuric acid is in wide demand, it is foreseeable that with extensive use of high sulfur coal a time will come when the industrial demand of sulfuric acid is fully met and storage of vast amounts of the corrosive material will be necessary.

SUMMARY OF THE INVENTION

It is an object of the present invention to provide a dry method and apparatus for removing acidic impurities from flue gases that eliminates the many problems associated with slurry scrubbing systems.

It is a further object to provide a highly effective flue gas desulfurization technique using readily available material.

It is a further object to provide a simple, reliable apparatus for carrying out the method of the present invention.

It is a further object to provide a method of flue gas desulfurization which converts the sulfur oxide content of flue gas to a waste material that is substantially environmentally inert and poses no long range storage problems.

These and other objects are accomplished by providing a method for desulfurizing flue gas comprising conditioning said flue gas to increase the degree of water vapor saturation and contacting the conditioned gas with a substantially dry bed of scrubbing medium comprising a material selected from the group of mono, bi, and trivalent metal carbonates, bicarbonates, and oxides to cause sulfur oxides present in said flue gas to react with the subsurface molecules of the dry scrubbing medium forming a layer of reaction products on the scrubbing medium.

DETAILED DESCRIPTION

Figure 1:
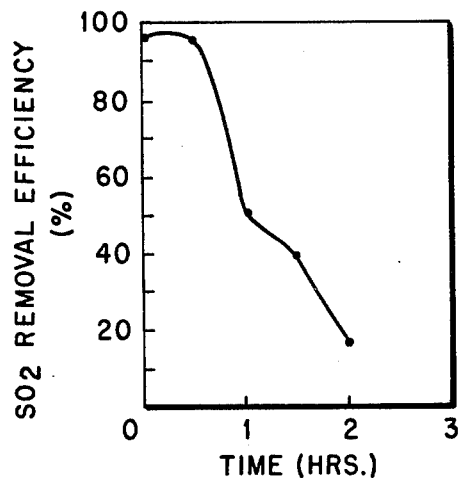
FIG. 1 is a graph showing the effects of cooling unconditioned flue gas.

Flue gas from a power plant burning coal of about 3.0% sulfur content usually contains about 0.2% $SO_2$ as well as a lesser amount of $SO_3$. Typically, this gas is passed through an electrostatic precipitator for fly ash removal. As the gas leaves the precipitator, it is usually at a temperature of about 300°F and its water vapor saturation temperature is about 95°F; that is, the dew point of the gas is about 95°F. At these normal conditions, the gas is relatively unreactive with dry limestone. The water vapor saturation temperature is the temperature at which the gas is fully saturated. The degree of saturation is the ratio of the water saturation temperature to the actual gas temperature.

It has been found according to the present invention that when flue gas is cooled to increase the degree of water vapor saturation, and passed through a bed of dry limestone chips, the sulfur oxides in the flue gas react with the surface molecules releasing $CO_2$ and forming a layer of reaction products. Furthermore, it has been found that at higher degrees of saturation, the reaction unexpectedly takes place below the surface, hence enabling many layers of subsurface molecules to participate in the reaction. Since many more reaction sites are available to sulfur oxides in the more saturated conditioned flue gas, the capability of dry limestone for scrubbing flue gas is greatly enhanced. As the reaction progresses, the enhanced reactivity will show some decrease, but the layer of reaction products, consisting chiefly of $CaSO_3$ and $CaSO_4$, is soft and sufficiently thick to be easily removed by mechanical means, i.e., agitation. By removing the layer of reaction products, a fresh limestone surface is exposed, restoring the reactivity to its original value. With periodic product removal, up to 90% of the limestone can be used in the reaction.

While the scrubbing process of the present invention may be carried out with the small limestone particles (200 mesh or less) used in the wet lime/limestone slurry processes, the enhanced reactivity of the conditioned flue gas permits the use of much larger particles. Successful results have been obtained with ½ inch particles and larger particles may be used in industrial applications. Aside from reducing crushing costs, the use of larger particles reduces the pressure drop across the bed, thereby reducing back pressure in the plant exhaust system. With reference to particle sizes, ½ inch refers to those particles which will pass through a ½ inch square mesh and 1/16 × ½ inch refers to those particles which will pass through a ½ inch mesh but will be retained on a 1/16 inch mesh.

The hot flue gas may be conditioned to increase its degree of water vapor saturation by injecting water or water vapor, or both. The desired cooling and conditioning may be easily achieved by spraying water or low pressure steam, or both, into the flue gas as in an evaporative cooler or by merely passing the gas over a pool of evaporating water. In the subject process, it has been found that virtually 100% of the $SO_2$ in stack gas may be removed by cooling and conditioning the flue gas to a temperature of 150°F and a saturation temperature of 150°F. While any increase in the degree of water vapor saturation has been found to increase the reactivity of flue gas with dry limestone, the best results are obtained when the flue gas is essentially 100% saturated when it passes through the dry bed.

The temperature of the gas must be high enough to promote the desired reaction and the release of $CO_2$ from the bed, at least 100°F. It is believed that some small amount of condensation must occur on the bed to promote the desired reaction between the sulfur oxides and the dry limestone. However, it has been found that excessive accumulation of water, caused by cooling the gas below its saturation temperature prior to passage through the bed, reduces the reactivity of the scrubbing medium. When water accumulates in the bed, the rate of reaction decreases due to the time required for dissolution of sulfur oxides and diffusion through the water layer to a reactive site on the limestone.

Since some gas temperature drop occurs across the bed due to normal heat transfer, the accumulation of water may be prevented if the gas enters the bed at a temperature above its saturation temperature, cooling to release a small amount of condensate as it passes through the bed. While some success has been achieved with a gas temperature of 250°F and a saturation temperature of 200°F, the preferred temperature range for the gas as it enters the bed has been found to be 140°–180°F, with substantially complete water vapor saturation. For purposes of the present invention, substantially complete saturation refers to a saturation temperature, usually within no more than about 20°F below the temperature of the gas as it enters the bed, where at least some condensation occurs during passage through the bed. While the optimum temperature for the reaction may be much higher, much larger quantities of water would be required to reach the desired degree of saturation, which could render the process uneconomical.

The maximum effective gas flow rate for a given application is a function of the particle size, the bed size, the gas temperature and the degree of water vapor saturation, and may be expressed in terms of space velocity, i.e., volume of gas per hour per volume of bed material. In a typical application using ¼ inch to 1/16 inch limestone chips, a space velocity as high as 4000 vol./vol./hr. will give satisfactory results. This space velocity corresponds, for example, to a bed of 5 × 6 × 1 foot for a power plant producing 120,000 cu. ft. of stack gas per hour. Larger pieces of limestone may be used, if desired, requiring a corresponding decrease in space velocity, i.e., greater bed dimensions.

The subject method will be experimentally illustrated with respect to the removal of $SO_2$ from simulated flue gas by limestone chips. It is to be understood that the method is also effective for $SO_3$ removal and that the limestone scrubbing medium may be replaced by other materials reactive with the sulfur oxides in flue gas saturated with water vapor. While limestone or dolomite (usually a mixture of $CaCO_3$ and $MgCO_3$) will most likely be used in large scale industrial applications for economic reasons, the subsurface reaction may be carried out with any mono, bi, or trivalent metal carbonate or bicarbonate as well as many oxides.

FIG. 1 demonstrates the effect of cooling flue gas prior to passage through a bed of dry crushed limestone. Dry simulated flue gas containing 1800 ppm $SO_2$ was heated to 280°F and passed through a conditioner to increase the water vapor saturation temperature to 100°F to simulate actual stack conditions from a coal-fired combustion source. The gas cooled during conditioning and passed through a cylindrical bed (1″ I.D. × 9″ deep) of limestone chips (approx. ¼ inch to 1/16 inch) at a space velocity of 490 vol./vol./hr. The gas passed through the bed at 145°–150°F. As seen from FIG. 1, the $SO_2$ removal efficiency is high for a short time and drops off rather rapidly.

Figure 2:
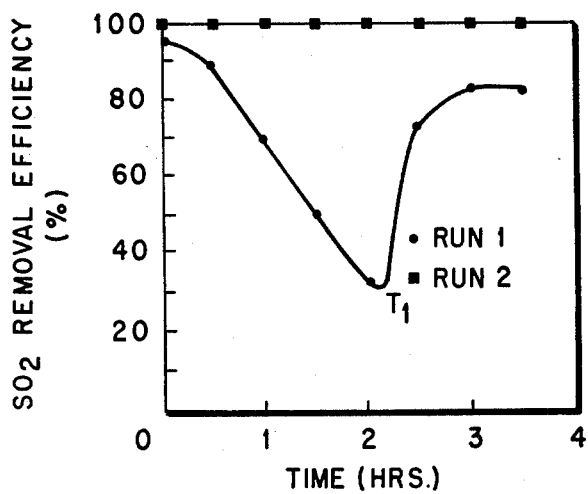
FIG. 2 is a graph showing the combined effect of increasing the water vapor content and cooling the flue gas.

FIG. 2 demonstrates the combined effects of cooling and increasing the water vapor saturation temperature above that of typical untreated flue gas. The gas was passed through a similar bed at 150°F. Run 1 initially involved gas with a water vapor saturation temperature of 110°F. At time $T_1$, the saturation temperature was increased to 120°F. The effect of the increased water vapor saturation on the reactivity of the bed is dramatically illustrated. Run 2 was carried out under similar conditions with gas at a saturation temperature of 150°F, that is the gas passing through the bed was completely saturated with water vapor. Under these conditions, 100% $SO_2$ removal efficiency is obtained.

Further experimentation has indicated that $SO_2$ removal efficiency greater than 90% can be achieved with space velocities in excess of 4000 at substantially complete saturation; that is, the water vapor saturation temperature is no more than about 20°F below the temperature of the flue gas as it passes through the bed.

The data presented in FIGS. 1 and 2 demonstrate that the degree of moisture content for a particular temperature enhances activity of the limestone surface for reaction with sulfur dioxide. Higher moisture content (up to substantially complete saturation) provides maximum reactivity. It appears that on cooling during passage through the dry bed, an optimum degree of condensation occurs which provides a means for promoting the penetration of sulfur oxides beneath the surface layer of reaction products. This optimum condensation of moisture induces the subsurface molecules to react at about the same rate as surface molecules. Too much moisture causes a decrease in reaction rate with time, just as too little moisture causes the reaction rate to decrease rather quickly.

To summarize, it is seen that dry limestone which is relatively unreactive with respect to untreated flue gas, is highly reactive if the flue gas has been cooled and treated with water vapor to substantially complete saturation. This enhanced reactivity is of extended duration and diminishes only as a relatively thick layer (1/16 inch) of reaction products is formed on the surface of the limestone. The duration of the enhanced reactivity is seen to increase as the water saturation temperature approaches the gas temperature as it flows through the bed. At substantially complete saturation, where at least some condensation is seen on the bed, the reactivity is enhanced to greater than 90% removal efficiency, with 100% efficiency attainable for low space velocities.

The role of water vapor in catalyzing the reaction is not understood. Some surface reactivity is attainable without adding additional water vapor, merely by cooling typical flue gas to about 140°–180°F. Very high reactivity due to subsurface reactions may be attained by adding additional water vapor which in turn cools the flue gas to the preferred temperature range (140°–180°F) by the process of evaporative cooling. It is believed that the higher degree of saturation, attained by adding water vapor to a point where at least some condensation occurs on the bed, catalyzes the subsurface reaction and the accompanying release of $CO_2$, thereby accounting for the extended duration of the enhanced reactivity.

As indicated earlier, the reaction product layer which forms on the limestone, relatively thick due to subsurface reactions, may be easily removed by any suitable means, i.e., mechanical agitation, either directly from the bed in place or by removing the reacted limestone from the bed and removing the product layer in adjunct equipment to restore a fresh reactive surface. The treated limestone is then recycled to the bed. Up to 90% of the limestone may now be utilized in the reaction. For efficient operation of a continuous removal process, it is necessary that the layer of reaction products be sufficiently thick, greater than about 1/32 inch, to be easily broken off. The subject method is particularly adaptable to a moving bed operation.

While 100% removal efficiency may be attained by substantially complete saturation, it is contemplated by this invention that the degree of water vapor saturation for a particular application will be governed by the availability of water, the sulfur oxide content of the flue gas and the frequency of the reaction product removal.

Figure 3:
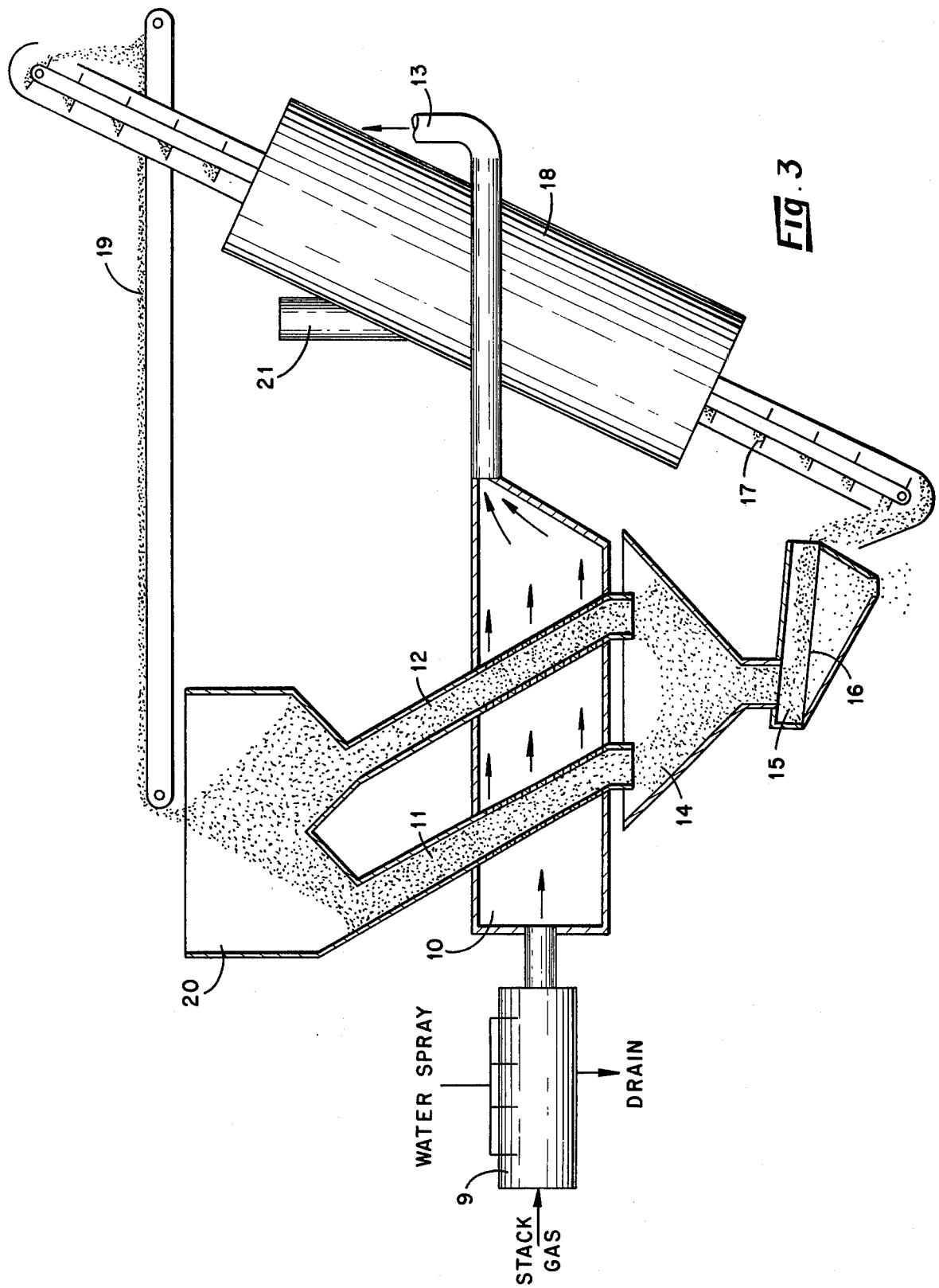
FIG. 3 is a schematic representation of an apparatus to carry out the method of the present invention.

FIG. 3 is a schematic diagram of an embodiment for carrying out the method of the present invention. Stack gas leaving an electrostatic precipitator (not shown) at about 300°F enters a conditioner (9) where it is subjected to a water spray to cool it to about 160°F and increase its water vapor level to substantially complete saturation. The conditioned gas is then passed to a scrubber (10) where it passes through two moving beds (11 and 12) of limestone or dolomite chips (½ × 1/16 inch) at a combined space velocity of about 4000 vol.-/vol./hr. and out through conduit (13) to the outside air. The scrubbing medium is passed through the beds to a collector (14), and then to an agitator containing a vibrating screen (16) of 1/16 inch square mesh. The reaction products, mostly sulfates and sulfites, pass through the screen and are removed from the system along with fines. In this manner the fines, which are difficultly recoverable and tend to clog the bed when moist, make only a single pass through the moving bed. The agitated material, which now has a freshly exposed reactive surface, is passed via lift (17) through a storage vessel (18) where fresh scrubbing medium is taken up to replace that amount consumed in the reaction, and on to a conveyor (19) where it is transported to a feed hopper (20) and back to the moving beds. Fresh scrubbing medium is continuously supplied to the storage vessel from a hopper through inlet (21). Alternatively, fresh scrubbing medium may be added to the conveyor (19) or to the feed hopper (20). The use of two beds permits greater regulation of $SO_2$ emissions.

As the conditioned gas passes through the bed, its temperature is reduced to about 150°F through contact with the cooler limestone. While a small amount of condensation appears on the bed to promote the subsurface reaction, the process is substantially dry in comparison to slurry scrubbing wherein the scrubbing medium is well over 50% water. The reaction products are virtually environmentally inert and may be used for landfill and the like.

What is claimed is:

1. A method of desulfurizing flue gas comprising conditioning said flue gas to a temperature no lower than about 100°F and to substantially complete water vapor saturation and contacting the conditioned flue gas with a substantially dry bed of scrubbing medium to cause the condensation of water on the bed, said scrubbing medium comprising pieces of material larger than 1/16 inch said material selected from the group of mono-bi-and trivalent metal carbonates and bicarbonates, to cause sulfur oxides present in said flue gas to react with subsurface molecules of the scrubbing medium forming a layer of reaction products thicker than about 1/32 inch on the scrubbing medium, and periodically removing said reaction products from the scrubbing medium by mechanical means to expose a reactive surface.

2. The method of claim 1 further comprising removing partially reacted scrubbing medium from the bed, treating the partially reacted scrubbing medium to remove the layer of reaction products and restore a reactive surface, and returning the treated scrubbing medium to the bed for further use.

3. The method of claim 1 wherein said scrubbing medium comprises a material selected from the group of $MgCO_3$ and $CaCO_3$.

4. The method of claim 3 wherein said flue gas is conditioned to a temperature above its water vapor saturation temperature and the conditioned flue gas is cooled to release condensate as said flue gas contacts the bed of scrubbing medium.

5. The method of claim 3 wherein said conditioning step comprises cooling said flue gas to 140°–180°F.

* * * * *